(12) United States Patent
Hashimoto et al.

(10) Patent No.: US 8,669,708 B2
(45) Date of Patent: Mar. 11, 2014

(54) ILLUMINANCE SENSOR SETTING DEVICE

(75) Inventors: Koichiro Hashimoto, Tsu (JP);
Tomoaki Sasaki, Tsu (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 13/325,629

(22) Filed: Dec. 14, 2011

(65) Prior Publication Data

US 2012/0153842 A1  Jun. 21, 2012

(30) Foreign Application Priority Data

Dec. 17, 2010  (JP) ................................. 2010-282340

(51) Int. Cl.
*H05B 37/02*  (2006.01)
(52) U.S. Cl.
USPC .......................................... 315/155; 315/152
(58) Field of Classification Search
USPC ........................ 315/155, 157, 152, 150, 134
See application file for complete search history.

(56) References Cited

U.S. PATENT DOCUMENTS 6,548,967 B1 * 4/2003 Dowling et al. ............... 315/318
2008/0244104 A1 * 10/2008 Clemente ........................ 710/11

FOREIGN PATENT DOCUMENTS

JP  11-191492  7/1999
JP  2005-044754  2/2005

* cited by examiner

*Primary Examiner* — Daniel D Chang
(74) *Attorney, Agent, or Firm* — Greenblum & Bernstein, P.L.C.

(57) ABSTRACT

An illuminance sensor setting device includes: an illuminance sensor that outputs a signal for switching a lighting apparatus, and a setting unit that performs setting of the illuminance sensor. The illuminance sensor and the setting unit are provided separately from each other, and are connected to signal lines. The setting unit has a configuration to set a sensor address of the sensor, a control address of the lighting apparatus, and an illuminance reference for switching the lighting apparatus. The setting unit transmits to the signal line the setting signal and the sensor address. Thus, even if the illuminance sensor is provided on, for example, the ceiling in the vicinity of the lighting apparatus, the setting unit can be provided at any place, such as a wall, where the setting unit can be easily operated, and work for settings is facilitated.

12 Claims, 4 Drawing Sheets

ILLUMINANCE SENSOR SETTING DEVICE

FIELD OF THE INVENTION

The present invention relates to an illuminance sensor setting device that detects ambient illuminance and performs dimming control for a lighting apparatus.

BACKGROUND OF THE INVENTION

Conventionally, there has been known an illuminance sensor setting device that includes: an illuminance sensor that detects ambient illuminance and controls a lighting apparatus so as to light up or extinguish the lighting apparatus in accordance with the ambient illuminance; and a setting unit to perform various operation settings of the illuminance sensor (see, for example, Patent Document 1). The illuminance sensor is attached in the vicinity of the lighting apparatus provided on a ceiling or the like, and the setting unit is provided separately from the illuminance sensor. If the ambient illuminance has reached an operation illuminance set by the setting unit, the illuminance sensor lights up or extinguishes the lighting apparatus.

In the illuminance sensor setting device, since the illuminance sensor and the setting unit are provided separately from each other, it is not necessary to approach the ceiling or the like for, for example, setting, changing, or confirming the operation illuminance. Thus, work for setting or the like is facilitated.

CITATION LIST

Patent Document

Patent Document 1: Japanese Laid-Open Patent Publication No. 2005-044754

BRIEF SUMMARY OF THE INVENTION

Problems to be Solved by the Invention

There is known a lighting control system in which a lighting apparatus, various switches to turn on or off the lighting apparatus in accordance with various conditions, and a control apparatus that controls the lighting apparatus in accordance with the operation of the switches, are networked via transmission signal lines. In the lighting control system, addresses are respectively assigned to the lighting apparatus, the switches, and the control apparatus, and a transmission unit performs centralized control of signal transmissions among these apparatuses by using the addresses.

It is desired that the above-described illuminance sensor setting device is applied to the lighting control system. In order to apply the illuminance sensor setting device, it is also necessary to set an illuminance sensor address, as a specific address, for the illuminance sensor which performs the lighting-up/extinction control for the lighting apparatus.

Thus, it is conceivable that a switch or the like used for setting the illuminance sensor address is provided in the illuminance sensor. However, in the case where the illuminance sensor is provided on a ceiling, it is necessary to approach the ceiling for operating the switch, and thus work for setting is troublesome.

The present invention has been made to solve the conventional problems described above, and an object of the present invention is to provide an illuminance sensor setting device in which work for setting an illuminance sensor address and an operation illuminance is facilitated and a control address of a lighting apparatus can be set in a simplified manner.

Solution to the Problems

In order to achieve the above object, an illuminance sensor setting device according to the present invention comprises:
an illuminance sensor which detects the illuminance value of ambient illuminance and outputs a signal for control a lighting apparatus so as to light up or extinguish the lighting apparatus in accordance with the detected illuminance value; and
a setting unit to perform operation settings of the illuminance sensor, wherein
the illuminance sensor and the setting unit are provided separately from each other, and connected to a transmission signal line in a lighting control system,
the setting unit has a configuration to set an illuminance sensor address of the illuminance sensor, a control address of the lighting apparatus, and an operation illuminance, and
when the settings have been performed, transmits, to the transmission signal line, a setting signal indicating the settings, together with an information signal indicating the illuminance sensor address, and
the illuminance sensor, when the illuminance value detected by the sensor has reached the operation illuminance, transmits, to the transmission signal line, an information signal indicating the control address, and a control signal for lighting up or extinguishing the lighting apparatus.

Preferably, in the illuminance sensor setting device, a transmission unit which transmits the control signal, and a signal transmitted between the illuminance sensor and the setting unit, is connected to the transmission signal line.

Preferably, in the illuminance sensor setting device, the illuminance sensor comprises a plurality of the illuminance sensors, and
the setting unit has a configuration to set illuminance sensor addresses of the plurality of illuminance sensors.

Preferably, in the illuminance sensor setting device, each of the plurality of illuminance sensors comprises a sensor switch to turn on or off an illuminance detection function of the illuminance sensor, and
the setting unit has an operation switch to turn on or off the illuminance detection function of the illuminance sensor.

Preferably, in the illuminance sensor setting device, when one of the sensor switch and the operation switch is pressed and held, switching of the illuminance detection function by the pressing and holding is held in a priority state, so that after the switching, even if the other one is normally pressed, the state of the illuminance detection function is not switched.

Effects of the Invention

According to the present invention, the illuminance sensor, and the setting unit to set the illuminance sensor address, the operation illuminance, and the control address of the lighting apparatus, are provided separately from each other. Therefore, even if the illuminance sensor is provided on, for example, the ceiling in the vicinity of the lighting apparatus, the setting unit can be provided at any place, such as a wall, where the setting unit can be easily operated. Therefore, it is not necessary to approach the ceiling for setting the illuminance sensor address and the operation illuminance, and thus work for settings is facilitated. In addition, the control address of the lighting apparatus can be set in a simplified manner.

DETAILED DESCRIPTION OF THE INVENTION

Hereinafter, illuminance sensor setting devices according to embodiments of the present invention will be described with reference to the drawings.

First Embodiment

Figure 1:
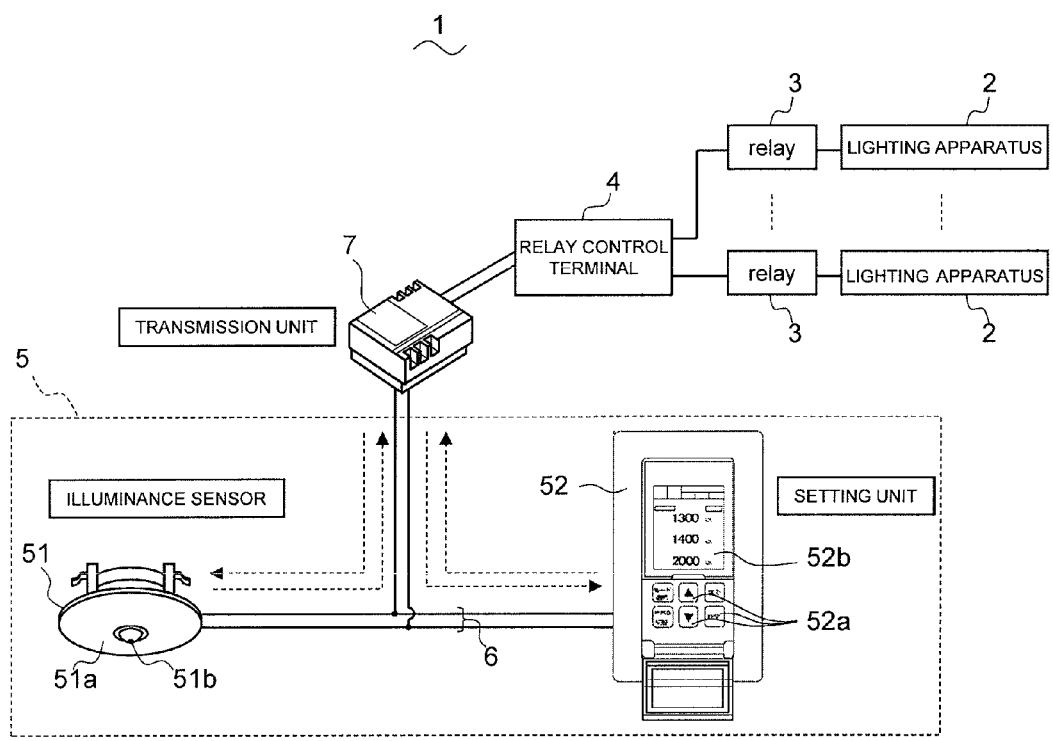
FIG. 1 shows a lighting control system including an illuminance sensor setting device according to the first embodiment of the present invention.

FIG. 1 shows the configuration of a lighting control system including an illuminance sensor setting device according to the first embodiment of the present invention. A lighting control system 1 includes: a plurality of lighting apparatus 2; a plurality of relay 3 to light up or extinguish the respective lighting apparatus 2; a relay control terminal 4; and an illuminance sensor setting device 5 that sets an operation of the illuminance sensor so as to light up or extinguish the lighting apparatus 2 in accordance with ambient illuminance, by using the relay 3 and the relay control terminal 4. The illuminance sensor setting device 5 includes: an illuminance sensor 51 that detects the ambient illuminance around the lighting apparatus 2, and outputs a signal for the lighting apparatus 2 so as to light up or extinguish the lighting apparatus 2 in accordance with the detected illuminance value; and a setting unit 52 to perform operation settings of the illuminance sensor 51. The illuminance sensor 51 and the setting unit 52 are provided separately from each other.

The relay control terminal 4, the illuminance sensor 51, and the setting unit 52 are networked being connected to signal lines 6 of two-wire type having positive and negative polarities. A transmission unit 7 that performs centralized control of signal transmissions is connected to the signal lines 6. Specific addresses are respectively assigned to the relay control terminal 4, the illuminance sensor 51, and the setting unit 52. The transmission unit 7 performs the centralized control of signal transmissions by using the specific addresses. When transmitting a signal to the signal lines 6, each of the relay control terminal 4, the illuminance sensor 51, and the setting unit 52 transmits an information signal indicating the address of the transmission destination, together with the signal to be transmitted. The transmission unit 7 reads the information signal to detect the transmission destination, and transmits the received signal to an apparatus at the transmission destination. The signal transmission between the transmission unit 7, and each of the relay control terminal 4, the illuminance sensor 51, and the setting unit 52 is performed by a multiplexing transmission method, for example.

The lighting apparatus 2 is provided on the ceiling of a room, for example. Commercial AC voltages for driving are supplied from a breaker power supply (not shown) to the lighting apparatus 2. The relay 3 turns on or off the supply of voltage by switching operation, thereby lighting up or extinguishing the respective lighting apparatus 2. The relay control terminal 4 switches the relay 3 individually between ON and OFF, thereby switching the respective lighting apparatus 2 between lit-up states and extinguished states.

A circuit board of the illuminance sensor 51 is covered with a cover 51a. An opening is formed on the cover 51a, and a sensor device 51b is exposed through the opening. The illuminance sensor 51 is attached to the ceiling of a room in the vicinity of the lighting apparatus 2, for example. If a detected illuminance value has reached a predetermined operation illuminance, the illuminance sensor 51 lights up or extinguishes some or all of the lighting apparatus 2, thereby realizing efficient lighting.

The illuminance sensor 51 has a function of notifying the setting unit 52 of information about the current state of the illuminance sensor 51 at regular intervals. The information includes: a detected illuminance value; the ON/OFF state of an illuminance detection function; whether or not ambient illuminance can be obtained when the illuminance detection function is ON; and error. In order to notify the setting unit 52 of these pieces of information, the illuminance sensor 51 transmits, to the signal lines 6, an information signal indicating the illuminance sensor address of the setting unit 52, together with a signal indicating each piece of information.

The setting unit 52 has operation switches 52a and a liquid crystal monitor 52b on the front surface thereof, and is designed such that a single-gang switch plate can be attached so as to surround the operation switches 52a and the liquid crystal monitor 52b. The setting unit 52 is embedded in the wall surface of a room, for example. The liquid crystal monitor 52b displays the settings performed with the operation switches 52a, and the pieces of information transmitted from the illuminance sensor 51.

In the setting unit 52, the illuminance sensor address shared by the illuminance sensor 51 and the setting unit 52, a control address of each lighting apparatus 2, and an operation illuminance can be set through the operation of the operation switches 52a. The operation illuminance indicates a reference for switching the lighting apparatus 2 between a lit-up state and an extinguished state. If the ambient illuminance has reached the operation illuminance, the lighting apparatus 2 is thus switched. A plurality of operation illuminances may be set so that the lighting apparatus 2 can be dimmed at a plurality of levels. In addition, in the setting unit 52, the lighting apparatus 2 to be switched to a lit-up state or an extinguished state when the ambient illuminance has reached the operation illuminance can be set through the operation of the operation switches 52a. If the above settings have been performed, the setting unit 52 transmits, to the signal lines 6, a setting signal indicating the settings, together with an information signal indicating the illuminance sensor address, thereby reflecting the above settings in the operation settings of the illuminance sensor 51. The setting unit 52 may be applied to set a control address of another connected apparatus such as a ventilating fan or a group address for performing group control.

Also, through the operation of the operation switches 52a, the illuminance detection function of the illuminance sensor 51 can be forcibly turned on or off. If this operation is performed, the setting unit 52 transmits, to the signal lines 6, a signal for turning on or off the illuminance detection function, together with an information signal indicating the illuminance sensor address. Since the same illuminance sensor address is set for the illuminance sensor 51 and the setting unit 52, each of the illuminance sensor 51 and the setting unit 52 can transmit a signal to each other by using its own illuminance sensor address.

The illuminance sensor 51 may have a function as a dimming terminal that dims each of the lighting apparatus 2, and the setting unit 52 may have a function as a dimming switch that sets the dimming level (dimming ratio) of each of the lighting apparatus 2. The illuminance sensor 51 may transmit, to each of the lighting apparatus 2, via a dimming signal line provided separately from the signal lines 6, a dimming signal for instructing the lighting apparatus 2 to light up at a dimming level set by the setting unit 52, and may cause a dimming circuit provided in the lighting apparatus 2 to adjust the light based on the dimming signal.

Figure 2:
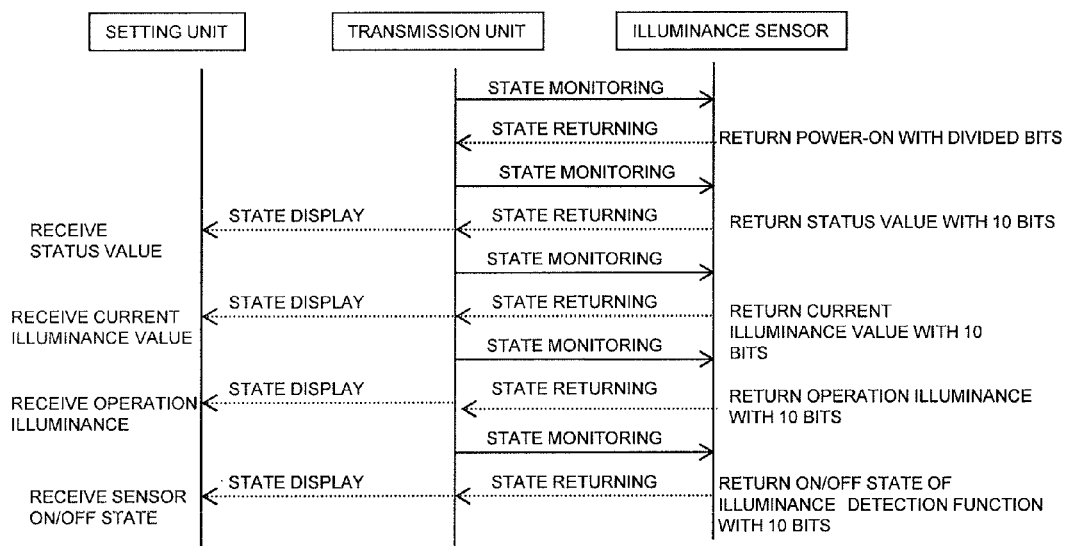
FIG. 2 is a signal transmission chart of the lighting control system.

FIG. 2 shows signals transmitted among the illuminance sensor 51, the setting unit 52, and the transmission unit 7. The transmission unit 7 transmits, to the illuminance sensor 51, at regular intervals, a plurality of state monitoring signals for requesting the illuminance sensor 51 to notify the transmission unit 7 of various current states. The illuminance sensor 51 receives the state monitoring signals, and returns pieces of information indicating that power is on, a status value, the current illuminance value, the operation illuminance, and the ON/OFF state of the illuminance detection function, in response to the respective state monitoring signals. When returning the information indicating that power is on, since the information amount is small, the illuminance sensor 51 returns the information with less than 10 bits by dividing 10 bits which are allocated in advance for returning information. In the other cases, the illuminance sensor 51 returns information with 10 bits. Of the above pieces of information returned by the illuminance sensor 51, the transmission unit 7 transmits the status value, the current illuminance value, the operation illuminance, and the ON/OFF state of the illuminance detection function, to the setting unit 52, and instructs the setting unit 52 to display them.

In the case where the illuminance sensor 51 and the setting unit 52 have functions as the dimming terminal and the dimming switch, respectively, the transmission unit 7 transmits, to the illuminance sensor 51, a state monitoring signal for requesting the illuminance sensor 51 to notify the transmission unit 7 of an actual dimming level. The illuminance sensor 51 returns information indicating an actual dimming level, in response to the state monitoring signal. The transmission unit 7 transmits the returned information to the setting unit 52.

Next, the operation of each unit performed in the lighting-up/extinction control of the lighting apparatus 2 will be described, with reference to FIG. 1 again. If the illuminance value detected by the illuminance sensor 51 has reached the operation illuminance, the illuminance sensor 51 transmits, to the signal lines 6, a control signal for lighting up or extinguishing the lighting apparatus 2, together with an information signal indicating the control address of the lighting apparatus 2 to be lit up or extinguished. The transmission unit 7 reads the control address from the information signal transmitted to the signal lines 6, and transmits the control signal to the relay control terminal 4. The relay control terminal 4 determines the lighting apparatus 2 having the control address to be a control target, selects the relay 3 corresponding to the lighting apparatus 2, and turns on or off the selected relay 3 based on the control signal, thereby lighting up or extinguishing the lighting apparatus 2 to be controlled.

In the illuminance sensor setting device 5 of the present embodiment, the illuminance sensor 51, and the setting unit 52 to set the illuminance sensor address, the operation illuminance, and the control address of each of the lighting apparatus 2, are provided separately from each other. Therefore, even if the illuminance sensor 51 is provided on, for example, the ceiling in the vicinity of the lighting apparatus 2, the setting unit 52 can be provided at any place, such as a wall, where the setting unit 52 can be easily operated. Therefore, it is not necessary to approach the ceiling for setting the illuminance sensor address and the operation illuminance, and thus work for settings is facilitated. In addition, the control address of each of the lighting apparatus 2 can be set in a simplified manner.

In addition, the transmission unit 7 is used both for the transmission of the control signal from the illuminance sensor 51 to each of the lighting apparatus 2, and for the transmission of signals between the illuminance sensor 51 and the setting unit 52. Therefore, it is not necessary to provide two transmission units for both the transmissions, and the fabrication cost can be reduced. In addition, in the case where a lighting control system that includes the components of the lighting control system 1 other than the setting unit 52 has been already installed, and then the setting unit 52 is added to the lighting control system to construct the lighting control system 1, it is possible to cause the setting unit 52 to be communicable with each unit, without changing the settings of the transmission unit 7 and the like. Therefore, the setting unit 52 can be added and set in a simplified manner.

Next, variations of the present embodiment will be described.

(First Variation)

Figure 3:
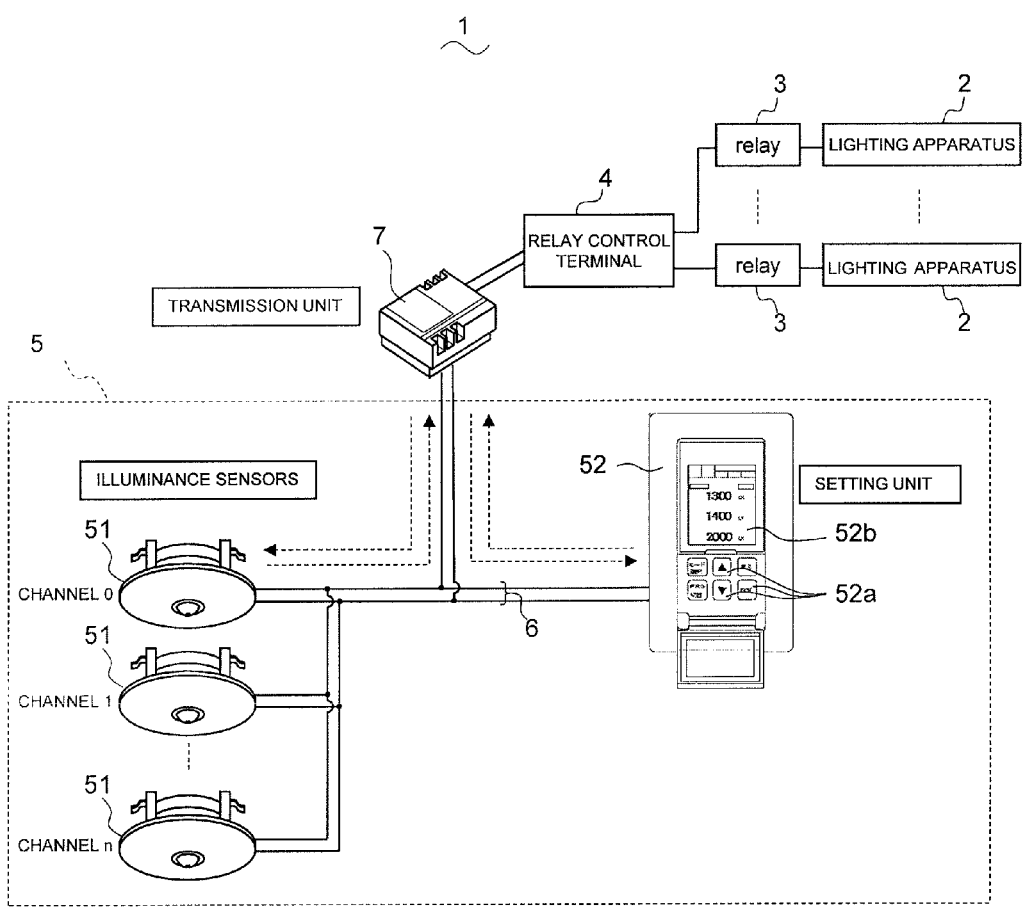
FIG. 3 shows a lighting control system including an illuminance sensor setting device according to the first variation of the first embodiment.

FIG. 3 shows the configuration of a lighting control system including an illuminance sensor setting device according to the first variation. In the illuminance sensor setting device 5 of the present variation, a plurality of the illuminance sensor 51 is provided, and the setting unit 52 has a configuration to set the illuminance sensor addresses of the plurality of illuminance sensor 51. Here, in the case where the number of the illuminance sensor 51 is n, in the setting unit 52, illuminance sensor addresses of channel 0 to channel n can be set for the n illuminance sensor 51, respectively, through the operation of the operation switches 52a. In the setting unit 52, the operation illuminance, and the content of control of the lighting apparatus 2 to be performed when the ambient illuminance has reached the operation illuminance, can be set for each illuminance sensor 51. The setting unit 52 receives the illuminance values detected by the n illuminance sensor 51, and displays the received illuminance values.

According to the present variation, it is possible to, by using one setting unit 52, set the illuminance sensor addresses of a plurality of the illuminance sensor 51, and confirm the illuminance values detected by the plurality of the illuminance sensor 51. Therefore, it is not necessary to provide a plurality of the setting units 52 for the settings and the confirmation, for the respective illuminance sensor 51. Therefore, the fabrication cost can be reduced.

(Second Variation)

Figure 4:
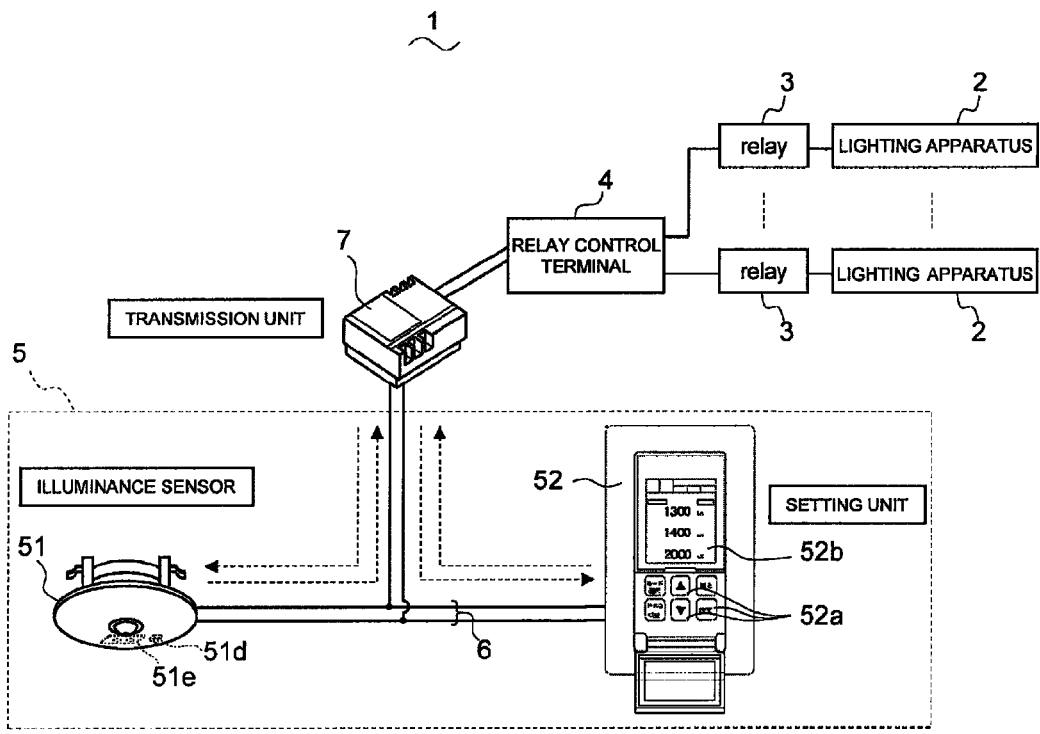
FIG. 4 shows a lighting control system including an illuminance sensor setting device according to the second variation of the first embodiment.
Figure 5:
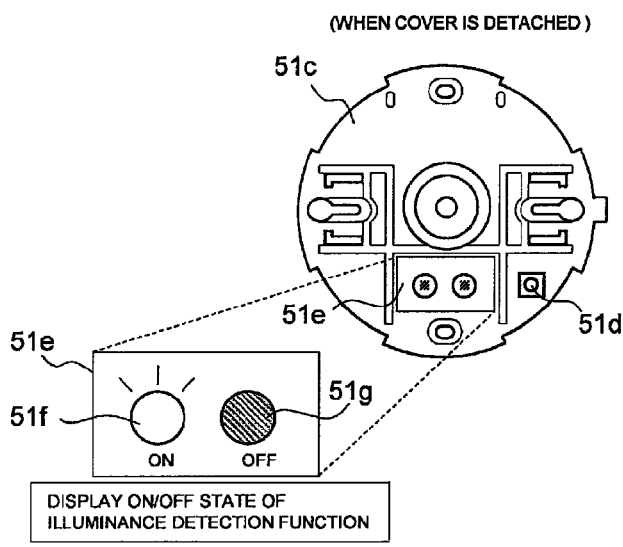
FIG. 5 is a plane view of an illuminance sensor of the illuminance sensor setting device as it is when a cover is detached.

FIG. 4 and FIG. 5 show the configuration of an illuminance sensor of an illuminance sensor setting device according to the second variation. The illuminance sensor 51 of the second variation has: a sensor switch 51d to turn on or off the illuminance detection function of the illuminance sensor 51; and a state display lamp 51e which displays the ON/OFF state of the illuminance detection function. The sensor switch 51d and the state display lamp 51e are mounted on a circuit board 51c of the illuminance sensor 51.

The sensor switch 51d is composed of a tactile switch to alternately switch the state of the illuminance detection function by being pressed repeatedly. If the state of the illuminance detection function of the illuminance sensor 51 is switched by one of the illuminance sensor 51 (sensor switch 51*d*) and the setting unit 52 (operation switch 52*a*), the one notifies the other one of information about the switching, thereby causing the other one to recognize the current condition and to switch the display of the state.

The state display lamp 51*e* is composed of two LEDs 51*f* and 51*g* having different light emission colors and corresponding to the ON state and the OFF state of the illuminance detection function, respectively. Each of the LEDs 51*f* and 51*g* lights up when the illuminance detection function is in the corresponding state.

The cover 51*a* may be designed to intercept the light from the state display lamp 51*e*, so that the light emission of the state display lamp 51*e* can be visually recognized only when the cover 51*a* is detached. Alternatively, the cover 51*a* may be translucent, so that the light emission can be recognized from the outside without detaching the cover 51*a*.

According to the present variation, it is possible to turn on or off the illuminance detection function of the illuminance sensor 51, at an actual place where the ambient illuminance is detected.

(Third Variation)

Since the components of an illuminance sensor setting device according to the third variation are the same as in the second variation, FIG. 4 is also used in the description below. In the illuminance sensor setting device 5 of the present variation, in an operation of switching the ON/OFF state of the illuminance detection function of the illuminance sensor 51, when one of the sensor switch 51*d* and the operation switch 52*a* is pressed and held, the switching of the state of the illuminance detection function by this operation is held in a priority state. After this switching, even if the other one is normally pressed, the state of the illuminance detection function is not switched. The priority of the state switching by the normal pressing operation is lower than that by the holding operation. Such priority switching of the state as described above can be released if one of the sensor switch 51*d* and the operation switch 52*a* that was pressed and held is pressed and held again, or if the other one is pressed and held, for example.

According to the present variation, in the case where, after the ON/OFF state of the illuminance detection function is switched by one of the sensor switch 51*d* and the operation switch 52*a*, it is desired that the state of the illuminance detection function will not be switched by the other one, it is possible to disable the switching operation of the other one by normal pressing if the one is pressed and held. Therefore, an arbitrary switching operation by the other one can be prevented to a certain extent.

It is noted that the present invention is not limited to the embodiment and variations described above, but various modifications can be devised in accordance with the intended use. For example, the number of the lighting apparatus 2 may be one. In the second variation, the state display lamp 51*e* may be composed of one LED that is lit up when the state of the illuminance detection function of the illuminance sensor 51 is ON, and is extinguished when the state is OFF. Each of the above variations may be combined with each other.

The invention claimed is:

1. An illuminance sensor setting device comprising:
an illuminance sensor which detects the illuminance value of ambient illuminance and outputs a signal to control a lighting apparatus so as to light up or extinguish the lighting apparatus in accordance with the detected illuminance value; and
a setter configured to perform operation settings of the illuminance sensor, wherein
the illuminance sensor and the setter are provided separately from each other, and connected to a transmission signal line in a lighting control system,
the setter is configured to set an illuminance sensor address of the illuminance sensor, a control address of the lighting apparatus, and an operation illuminance,
the illuminance sensor address, set through the setter, is shared by the illuminance sensor and the setter,
when the settings have been performed, the setter is configured to transmit, to the transmission signal line, a setting signal indicating the settings, together with an information signal indicating the illuminance sensor address, and
the illuminance sensor, when the illuminance value detected by the sensor has reached the operation illuminance, is configured to transmit, to the transmission signal line, an information signal indicating the control address, and a control signal for lighting up or extinguishing the lighting apparatus.

2. The illuminance sensor setting device according to claim 1, wherein a transmitter which transmits the control signal, and a signal transmitted between the illuminance sensor and the setter, is connected to the transmission signal line.

3. The illuminance sensor setting device according to claim 2, wherein
the illuminance sensor comprises a plurality of the illuminance sensors, and
the setter is configured to set illuminance sensor addresses of the plurality of illuminance sensors.

4. The illuminance sensor setting device according to claim 3, wherein
each of the plurality of illuminance sensors comprises a sensor switch to turn on or off an illuminance detection function of the illuminance sensor, and
the setter has an operation switch to turn on or off the illuminance detection function of the illuminance sensor.

5. The illuminance sensor setting device according to claim 4, wherein
when one of the sensor switch and the operation switch is pressed and held, switching of the illuminance detection function by the pressing and holding is held in a priority state, so that after the switching, even if the other one of the sensor switch and the operation switch is normally pressed, the state of the illuminance detection function is not switched.

6. The illuminance sensor setting device according to claim 2, wherein
the illuminance sensor comprises a sensor switch to turn on or off an illuminance detection function of the illuminance sensor, and
the setter has an operation switch to turn on or off the illuminance detection function of the illuminance sensor.

7. The illuminance sensor setting device according to claim 6, wherein
when one of the sensor switch and the operation switch is pressed and held, switching of the illuminance detection function by the pressing and holding is held in a priority state, so that after the switching, even if the other one of the sensor switch and the operation switch is normally pressed, the state of the illuminance detection function is not switched.

8. The illuminance sensor setting device according to claim 1, wherein
the illuminance sensor comprises a plurality of the illuminance sensors, and the setter is configured to set illuminance sensor addresses of the plurality of illuminance sensors.

9. The illuminance sensor setting device according to claim 8, wherein
each of the plurality of illuminance sensors comprises a sensor switch to turn on or off an illuminance detection function of the illuminance sensor, and
the setter has an operation switch to turn on or off the illuminance detection function of each of the plurality of illuminance sensors.

10. The illuminance sensor setting device according to claim 9, wherein
when one of the sensor switch and the operation switch is pressed and held, switching of the illuminance detection function by the pressing and holding is held in a priority state, so that after the switching, even if the other one of the sensor switch and the operation switch is normally pressed, the state of the illuminance detection function is not switched.

11. The illuminance sensor setting device according to claim 1, wherein
the illuminance sensor comprises a sensor switch to turn on or off an illuminance detection function of the illuminance sensor, and
the setter has an operation switch to turn on or off the illuminance detection function of each of the plurality of illuminance sensors.

12. The illuminance sensor setting device according to claim 11, wherein
when one of the sensor switching switch and the operation switch is pressed and held, switching of the illuminance detection function by the pressing and holding is held in a priority state, so that after the switching, even if the other one of the sensor switch and the operation switch is normally pressed, the state of the illuminance detection function is not switched.

* * * * *